United States Patent [19]

Jensen et al.

[11] Patent Number: 4,813,155

[45] Date of Patent: Mar. 21, 1989

[54] PROCESS AND APPARATUS FOR REMOVAL OF LIQUID FROM A SOLID PARTICULATE MATERIAL

[75] Inventors: Arne S. Jensen, Stege; Bjarne Winstrom-Olsen; Jorgen Borreskov, both of Nakskov, all of Denmark

[73] Assignee: Aktieselskabet de Danske Sukkerfabrikker, Copenhagen, Denmark

[21] Appl. No.: 89,028

[22] Filed: Aug. 24, 1987

Related U.S. Application Data

[63] Continuation of Ser. No. 703,397, Feb. 20, 1985, abandoned.

[51] Int. Cl.⁴ .......................... F26B 17/14; B01D 1/00

[52] U.S. Cl. ...................................... 34/57 E; 34/169; 159/47.1; 159/DIG. 2; 159/16.3

[58] Field of Search ..................... 159/47.1, 901, 16.3, 159/4.4, DIG. 2; 34/57 E, 169

[56] References Cited

U.S. PATENT DOCUMENTS

| | | | |
|---|---|---|---|
| 2,330,545 | 9/1943 | Benoit | 34/57 E |
| 2,435,927 | 2/1948 | Manning et al. | 34/57 E |
| 2,702,949 | 3/1955 | Parker, Jr. | 34/57 E |
| 2,856,268 | 10/1958 | Young | 34/57 E |
| 3,246,683 | 4/1966 | Yap et al. | 159/47.1 |
| 3,564,723 | 2/1971 | Passey et al. | 34/169 |
| 3,612,143 | 10/1971 | Ungerer | 159/4.02 |
| 3,704,010 | 11/1972 | Dennert et al. | 34/57 E |
| 4,040,898 | 8/1977 | Englander et al. | 159/47.1 |
| 4,171,243 | 10/1979 | Brooks et al. | 159/48.1 |
| 4,216,053 | 8/1980 | Powell et al. | 159/4.02 |
| 4,219,380 | 8/1980 | Muschelkrautz et al. | 159/47.1 |
| 4,293,524 | 10/1981 | Teller et al. | 159/48.1 |
| 4,352,718 | 10/1982 | Grün | 159/4.01 |
| 4,376,010 | 3/1983 | Gauvin | 159/48.1 |
| 4,615,123 | 10/1986 | Brown | 34/57 E |

*Primary Examiner*—David L. Lacey
*Assistant Examiner*—V. Manoharan
*Attorney, Agent, or Firm*—Watson, Cole, Grindle & Watson

[57] ABSTRACT

Liquid is evaporated from a particulate solid material by passing the material through a row of upwardly open, elongated interconnected cells and introducing superheated steam into the cells at their lower ends in a manner so as to impart to the particles a whirling movement. Dried particles are lifted out of the cells and into a common transfer zone and from said zone down into a discharge cell which has no steam supplied thereto. The dried material thus introduced into the discharge cell is discharged together with material which has passed the row of cells.

The invention eliminates the need for effecting an initial disintegration of the solid particulate material.

1 Claim, 4 Drawing Sheets

PROCESS AND APPARATUS FOR REMOVAL OF LIQUID FROM A SOLID PARTICULATE MATERIAL

This application is a continuation of application Ser. No. 703,397, filed Feb. 20, 1985, now abandoned.

BACKGROUND OF THE INVENTION

The present invention relates to a process for the removal of liquid from a solid particulate material of non-uniform particle size, the process comprising contacting the particulate material with superheated steam under non-oxidizing conditions to evaporate liquid contained in the particulate material, separating the solid material thus treated from the steam, and optionally utilizing the steam thus separated for the treatment of additional solid particulate material.

It is known to dry various organic materials by a process of the above-mentioned type. Thus, European patent application No. 82 850018.1 (Publication No. 0 058 651 A1) discloses a method of preparing cattle feed from various agricultural products, such as sugar beet pulp, molasses, citrus fruit pulp and peel and various fermentation products.

The prior art method comprises the steps of initially heating the particulate material with superheated steam and subsequently disintegrating the material to obtain a particulate material of uniform particle size. By using steam as carrier gas, the material thus formed is subsequently passed through a drier consisting of a plurality of tubular heat exchangers arranged in series and into a cyclone in which the solid material is separated and from which steam is recycled and admixed with the disintegrated material.

The purpose of disintegrating the solid particulate material before introducing it into the tubular heat exchangers is to avoid the problems associated with a material having a non-uniform particle size. Thus, such materials require tubular heat exchangers of great lengths to ensure that the largest particles have been efficiently dried when reaching the outlet end of the drier and the inlet of the cyclone. However, the disintegration is not only energy-consuming and makes the apparatus for performing the method more complicated, but the disintegration may additionally cause such changes in the character of the material that the use of the material becomes restricted. Thus, it is known that cattle feed should contain a relatively large proportion of coarse particles to ensure optimum digestion. The disintegration which serves to provide fine uniform particles has an adverse effect in this regard. Furthermore, the disintegration may cause dry material to be dusty.

SUMMARY OF THE INVENTION

The object of the present invention is to provide a process of the type defined above but wherein the need of disintegrating the material in connection with the removal of liquid therefrom is eliminated.

This object, and other objects which will appear from the following description, are achieved by the process of the invention which comprises the steps of successively passing the solid particulate material through a plurality of upwardly open, elongated, and essentially vertical zones which at the top ends communicate with a common transfer zone, introducing superheated steam into the major part of the elongated zones under conditions such that the solid particulate material present therein is subjected to a whirling movement and such that particles containing a reduced amount of liquid are carried out of the zones at their top ends and into the common transfer zone and are allowed to fall down into one or more zones with no steam supply, and discharging treated material from one or more of the latter zones.

Although the invention will be described in detail with reference to a process of drying a water-containing solid particulate material, it should be understood that the process and apparatus of the invention are also useful for the removal of other liquids than water from a solid particulate material.

The invention is based on the discovery that the efficiency of the drying of relatively large particles with superheated steam is considerably increased by separating fine particles when they have been dried, by increasing the residence time of the relatively large particles within the elongated zones and by improving the contact of the superheated steam with the particles. The increased residence time and improved contact are obtained by imparting to the particles the whirling movement.

The separation of the dried particles, or at least part of these particles, from the remaining particles is a result of the fact that the particles introduced into the common transfer zone under the influence of the upwardly directed streams of steam sooner or later fall into the zones with no steam supply. Thus, there will be no upwardly directed flows of steam in the latter zones and consequently the particles introduced into the space above these zones will move downwardly towards the bottoms of these zones. Thus, the particles may be collected at these bottoms and may be discharged therefrom.

Another effect of increasing the residence time of the particles within the steam treating zones and improving the contact between the particles and the superheated steam is that the total length of the steam-treating zones may be considerably reduced compared to the length of the steam-treating zones used in the prior art apparatus. Consequently, the apparatus for performing the process of the invention will be less expensive and will require less space than the prior art apparatus.

In a preferred embodiment of the invention adjacent steam-treating zones are interconnected at the lower ends of the zones and the material to be treated is supplied to the first zone of a row of zones. The supply may be effected in a continuous or discontinuous manner. Due to the influence of the force of gravity and because they are in constant motion, the particles will move towards the last zone in the row of zones and there is only a minor risk that particles pass through all zones without being dried.

Alternatively, the material may be confined in upwardly open compartments and these compartments may be moved through a path starting with an inlet zone and ending with an outlet zone while passing streams of superheated steam upwardly through the compartments located between the inlet and outlet zones.

An apparatus for performing the process of the invention requires only a very limited space if the treatment with steam is effected in an annular row of zones. By using an annular row of zones it is possible to use the central zone for the treatment of steam, e.g., heating the residual steam or the steam formed, and the steam thus treated may be recycled to the lower ends of the steam-treating zones so as to impart to the material contained therein the above-mentioned whirling movement.

When the drying of the particulate material is effected at superatmospheric pressure, it is particularly advantageous to use a circular row of treating zones because such zones can readily be provided within a circular pressure vessel. It should be understood that the drying with superheated steam can also be performed under vaccum.

The invention also relates to an apparatus for performing the process described above. The apparatus of the invention comprises a container having means for supplying solid particulate material to the container, means for supplying superheated steam to said container and means for discharging treated material therefrom, and the apparatus is characterized in that the container is divided into a plurality of elongated, essentially vertically-extending compartments, one or more of these compartments being closed at their lower ends and the remaining compartments having bottom walls which are pervious to steam, that adjacent compartments communicate with one another at their lower ends and at their upper ends communicate with a common transfer chamber, the means for supplying solid particulate material to container being connected to at least one compartment and the means for discharging treated material being connected to at least one other compartment, and that the means for supplying superheated steam to the container are connected to the zone below the steam pervious bottom walls of the compartments.

By blowing superheated steam into the compartments from the zone below the steam pervious bottom walls, a whirling movement is imparted to the particulate material present in these compartments and during this movement the water contained in the material is evaporated. The steam flowing up through the compartments causes part of the dried particles to move into the common transfer chamber in which the particles will move randomly, which means that they sooner or later will pass into a zone located above the compartment or compartments being closed at their lower ends. Since adjacent compartments are interconnected, the material initially present in a compartment eventually passes into an adjacent compartment. During the continuous movement through the row of upwardly open compartments, additional material in the form of dry particles leaves the compartments and passes through the common transfer chamber into the compartment or compartments which are closed at their bottoms, and the material is discharged from these compartments by means of suitable discharge means provided therein.

A preferred embodiment of the apparatus of the invention comprises a circular vessel which is divided into axially-extending compartments by means of radially-extending separating walls, providing compartments having a wedge-shaped cross-section. This cross-sectional shape favors the desired movement of particles within the compartments in upward and downward directions because the particles will preferably move in upward direction in the zone close to the wall of the vessel and in downward direction in the zone close to the centre axis. The desired movement may be intensified by providing in the lower part of each compartment an inclined wall which guides the material towards the wall of the vessel and which produces a horizontal outwardly directed stream of steam in the zone below the lower edge of said inclined wall.

The upper part of the circular vessel is preferably of a larger diameter than the lower part which is divided into the mentioned compartments, and that part of the wall of the vessel which is located in the upper part is preferably conical. The conical zone preferably comprises inclined plates which apart from causing the stream of steam to be uniformly distributed over the enlarged parts of the vessel serve to collect particles which have not been fully dried and to guide them back into the compartments and towards the bottoms of the compartments. Thus, such particles are collected on the upper surfaces of the plates and slide along these surfaces towards the lower ends of the compartments. In order to further ensure that particles which leave the top of the compartments have been efficiently dried, one or more sets of baffle plates may be provided above the inclined plates in the zone above the upper ends of the compartments. The inclination of these baffle plates may optionally be adjustable. The baffle plates also serve to collect non-dried particles.

In case it is desired to heat residual steam and newly formed steam outside the vessel and before the steam in heated condition is reintroduced into the vessel, a steam outlet is preferably provided at the top of the vessel.

In order to prevent particles from being entrained in the steam discharged from the vessel, the upper part of the vessel preferably comprises a set of blades located at some distance from the upper ends of the compartments and having such a shape that a cyclone field is generated as a result of the passage of the steam between the blades. The cyclone field thus generated forces the particles contained in the steam towards the wall of the vessel and back into the zone below.

In a particularly preferred embodiment of the apparatus of the invention which includes a circular vessel, a heat-exchanger comprising inlet means for high pressure steam and means for discharge of condensate is provided in the central part of the vessel, and the apparatus comprises means for conveying steam from the upper end of the vessel down through the heat-exchanger to the zone below the steam-pervious bottom walls of the compartments.

The conveying means may be a centrifugal fan mounted centrally in the lower part of the circular vessel. Also in this embodiment of the apparatus of the invention the upper part of the vessel preferably comprises means for separating particles from the steam before it passes down through the centrally located heat exchanger.

The connections between adjacent compartments of an apparatus comprising an annular row of compartments preferably consist of openings in the separating walls, the openings being provided immediately above the bottom walls of the compartments. The size of these openings preferably increases in the direction from the first to the last compartment of the row.

Apart from the openings in the separating walls provided above the bottom walls of the compartments, the apparatus of the invention may also comprise holes which are provided at higher levels of the compartments. For example, holes may be provided in the separating walls in the conical part of the vessel.

By suitably selecting the location and size of the holes or openings in the separating walls, the degree of filling of each compartment may be controlled.

In case the lower part of the compartment comprises inclined walls guiding the material moving towards the bottom walls of the compartments towards the wall of the vessel, the upper surface of said inclined walls may be provided with guiding means which guide large and heavy particles sliding along the inclined walls in a direction towards the opening which connects the compartments with the preceding compartment in the row of compartments and thus contributes to increasing the residence time of particles which are difficult to dry within each compartment.

The steam-pervious bottom walls of the compartments preferably consist of perforated plates. By selecting perforated plates having given diameters and/or patterns of perforations, the treatment of the material within the compartments may be controlled. The steam-pervious bottom walls may also consist of inclined, partially overlapping lamellae. Such bottom walls present the special advantage that the material does not fall down into the zone below the bottom walls in case the supply of superheated steam is disrupted.

DESCRIPTION OF THE PREFERRED EMBODIMENTS

Figure 1:
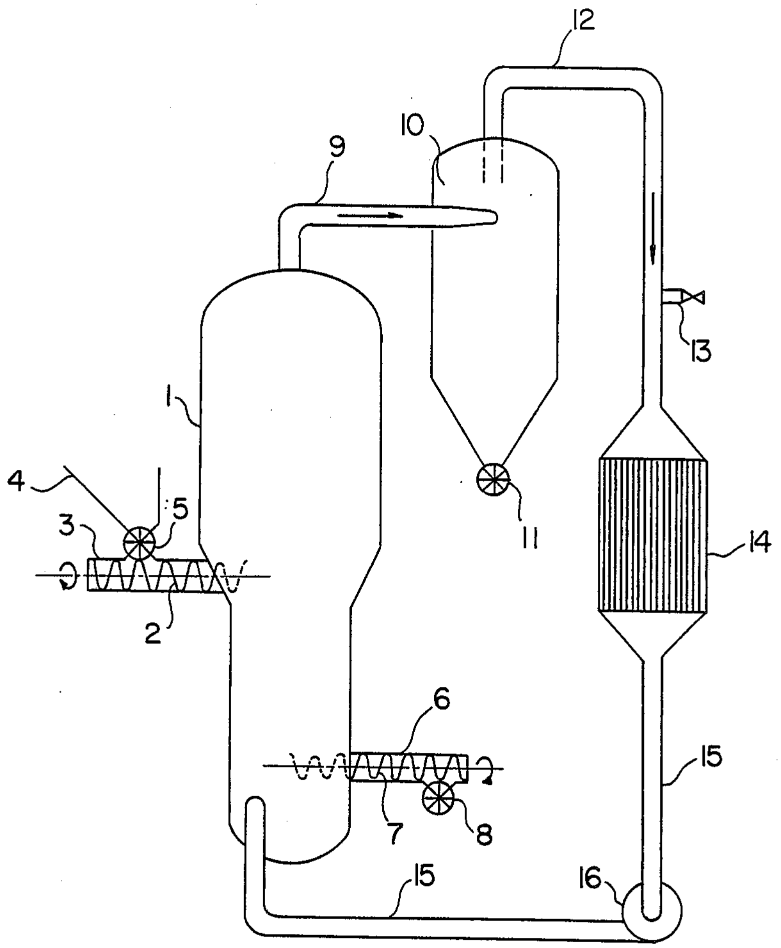
FIG. 1 schematically shows a preferred embodiment of the apparatus of the invention.

The apparatus illustrated in FIG. 1 comprises a drier vessel which will be described in further detail with reference to FIGS. 2 and 3. The vessel 1 is provided with inlet means comprising a screw conveyor 2 mounted in a pipe 3 which communicates with a feed hopper 4 via a bucket wheel 5. The vessel 1 also comprises discharge means located in the lower part of the vessel and comprising a pipe 6 having mounted therein a screw conveyor 7. The pipe 6 is connected with a bucket wheel 8. The upper end of the vessel 1 is connected with a cyclone 10 through a pipe 9. At the bottom of the cyclone 10 there is provided a bucket wheel 11, and the top of the cyclone is connected with a heat exchanger 14 through a pipe 12 having a pipe joint 13. The heat exchanger 14 comprises means (not shown) for supplying superheated steam to the heat exchanger and means (not shown) for discharging condensate therefrom. The lower end of the heat exchanger 14 is connected with the lower end of the vessel 1 through a pipe 15 having mounted therein a blower 16.

Figure 2:
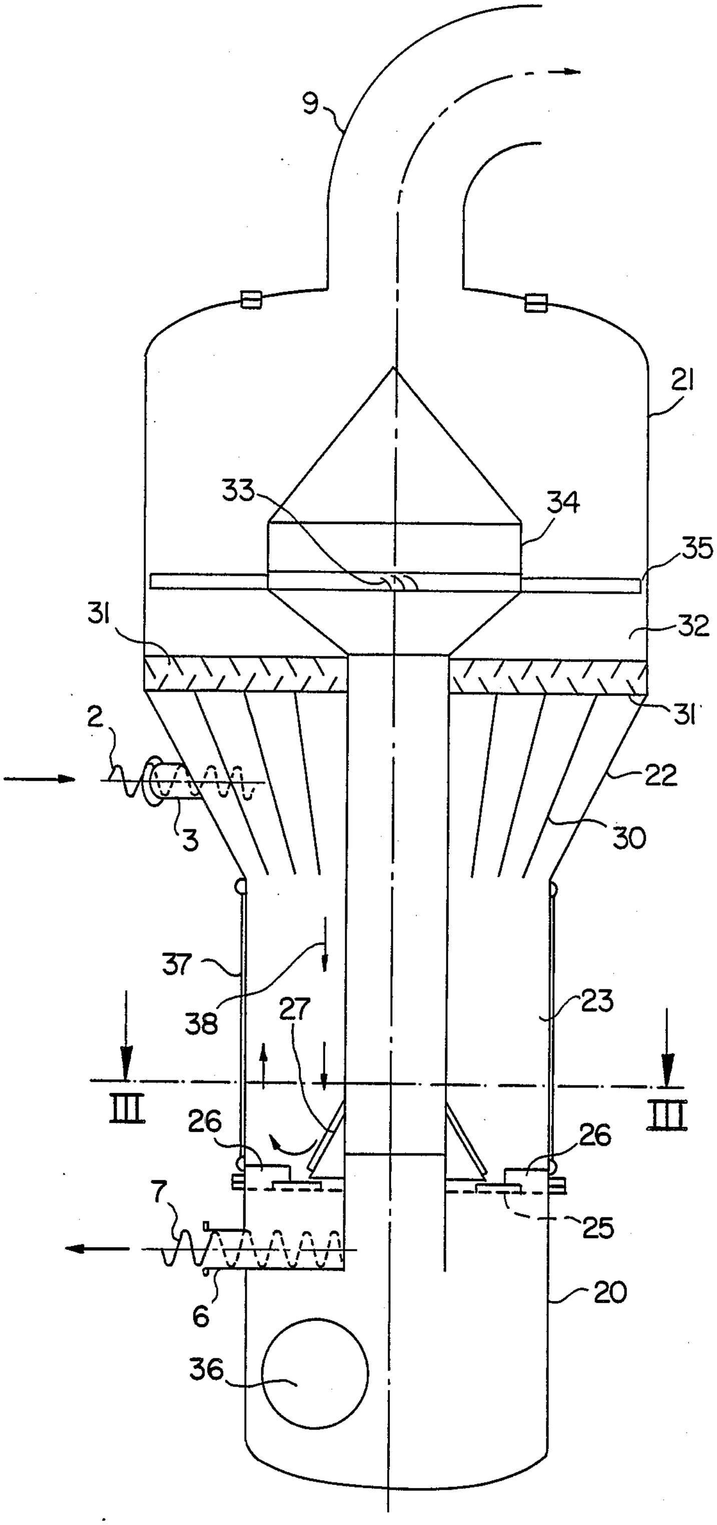
FIG. 2 shows a vertical sectional view through the vessel of the apparatus shown in FIG. 1.
Figure 3:
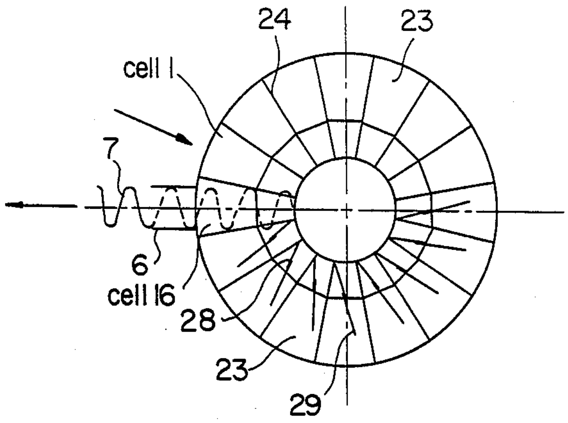
FIG. 3 shows a cross-sectional view along the line III—III of the vessel shown in FIG. 2.

The container 1 is shown in detail in FIGS. 2 and 3. It comprises a lower circular, cylindrical part 20, an upper circular, cylindrical part 21 of a larger diameter than that of the lower part 20 and an intermediate, conical part 22. The upper part of the lower circular, cylindrical part 20 as well as the conical part 22 of the vessel 1 are divided into compartments 23 (cell Nos. 1–16) by means of radially-extending separating walls 24. The supply means comprising the screw conveyor 2 opens into the upper part of one of the compartments 23 (cell No. 1), and the discharge means comprising the screw conveyor 7 is connected with the cell adjacent to cell No. 1, i.e. cell No. 16, and forms the bottom of the latter cell. Apart from cell No. 16 all compartments 23 have a steam-pervious bottom wall 25 in the form of a perforated plate, and the separating walls 24 between the cells (except for the separating wall 24 between cell No. 1 and cell No. 16) comprise holes 26 provided immediately above the bottom walls 25. Each compartment 23 comprises an inclined wall 27 extending downwardly from the central part of the compartment towards the wall of the vessel and having at its upper side a guide rod 28 forming an angle with the separating wall 24. Some of the cells comprise additional guide rods 29 mounted at the bottom walls 25 and extending outwardly from the ends of the guide rods 28 on the inclined walls 27. The guide rods 28 and 29 are mounted in such a manner that the material sliding along the inclined walls 27 and along the bottom walls 25 towards the wall of the vessel is guided towards the hole 26 in the separating walls and into the preceding cell in the row of cells 23.

In the conical part 22 of the vessel 1 there are provided in each compartment inclined plates 30 which are mounted in a manner so as to serve the dual function of distributing the streams of steam passing up through the compartments 23 over the enlarged cross-sectional area of the upper part 21 of the vessel and to collect particles contained in these streams of steam and to guide these particles back towards the bottom walls 25 of the compartments.

At the upper ends of the inclined plates 30 there are mounted two sets of baffle plates 31 also serving to collect particles contained in the streams of steam before these particles reach a transfer zone 32 and located between these baffle plates 31 and a set of blades 33 mounted on the exterior side of a stationary, centrally located core body 34. These blades 33 end a short distance from the wall of the vessel so as to form a slot 35 between the outermost ends of the blades and the wall of the vessel. The pipe 9 mentioned in connection with FIG. 1 extends from the top of the vessel 1, and an opening 36 provided in the lower end of the vessel 1 is connected with the pipe 15 mentioned in connection with FIG. 1.

Finally, the apparatus comprises a steam jacket 37 surrounding the lower part 20 of the vessel 1.

The apparatus shown is operated in the following manner:

Solid particulate material which is introduced into cell No. 1 via the pipe 3 is caused to move up and down within the cell in the direction shown by the arrows 38. This is due to the introduction of superheated steam through the steam-pervious bottom walls 25, the wedge shape of the cells and the inclined walls 27. During this whirling movement the heavier portion of the particles is moved into the following cell, and lighter dried particles are passed up into the conical part 22 of the vessel 1. Unless the particles are collected by the inclined plates 30 or the baffle plates 31 located thereabove, they reach the transfer zone 32. Dried particles are also introduced into the transfer zone 32 from the remaining cells having a steam-pervious bottom wall, and during the movement within the zone 32 these particles will sooner or later pass over cell No. 16. Since there is no upward stream of steam from this cell, the particles will fall down the cell towards its bottom. The particles collected at the bottom 25 of the cell are conveyed out of the vessel 1 by means of the screw conveyor 7.

The steam leaving the transfer zone 32 passes into the upper end of the vessel 1 and into the pipe 9. During this movement the steam passes the set of blades 33 which create the cyclone field causing particles entrained in the steam to move outwardly against the wall of the vessel. Having reached this wall, the particles move down into the transfer zone 32 through the slot 35.

The guide rods 28 and 29 on the inclined walls 27 and the bottom walls 25, respectively, guide particles moving down through the cells in a zone close to the axis of the vessel towards the holes in the separating walls 24 so as to enter the preceding cells. In this manner they tend to increase the residence time of the particles in each cell.

The steam leaving the vessel 1 passes through the pipe 9 into the cyclone 10 in which an additional separation of solid particles is effected. The separated particles are discharged at the bottom of the cyclone by means of the bucket wheel 11.

Steam leaving the top of the cyclone 10 is passed through the pipe 12 to the heat exchanger and excessive steam is discharged through the pipe joint 13. After being re-heated in the heat exchanger, the superheated steam is recycled through the pipe 15 and by means of the blower 16 into the zone below the steam-pervious bottom walls 25 of the vessel 1 and from this zone up into the compartments 23.

The steam jacket 37 on the lower part 20 of the vessel 1 serves to maintain the steam in a superheated condition. The apparatus may also be provided with means for heating the separating walls and additional heating surfaces may be mounted within the compartments 23.

Figure 5:
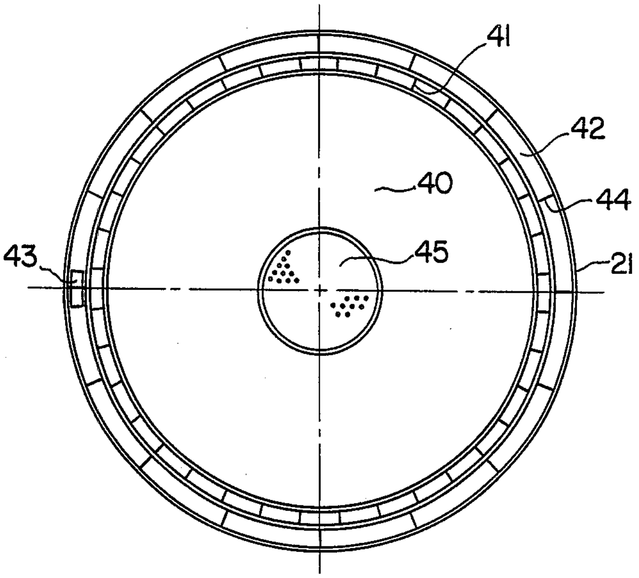
FIG. 5 shows a sectional view along the line V—V of the vessel of the apparatus shown in FIG. 4.
Figure 4:
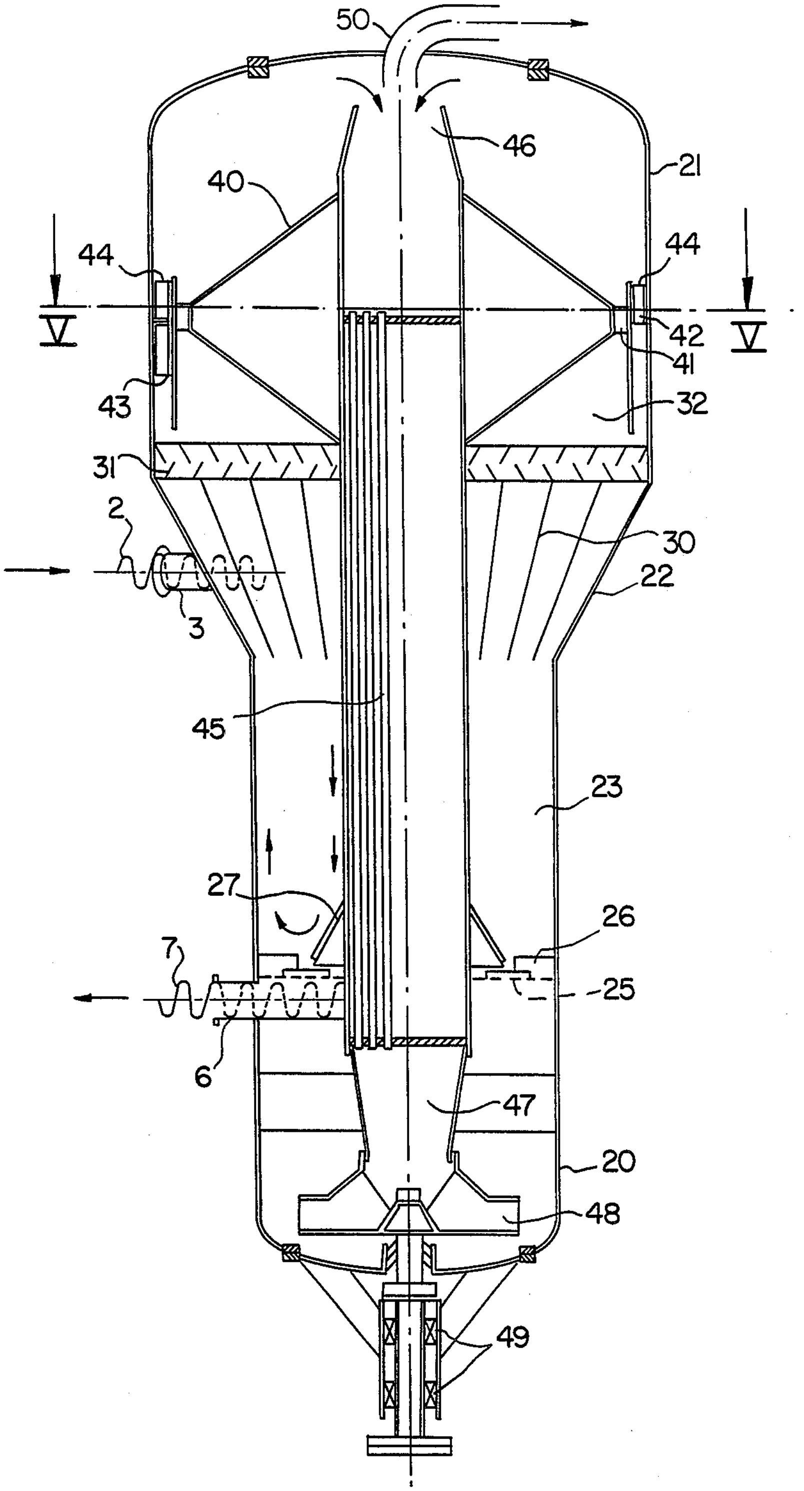
FIG. 4 shows a vertical sectional view through another embodiment of the apparatus of the invention.

FIGS. 4 and 5 show an embodiment in which the heat exchanger for heating residual steam and/or steam formed during the drying operation before it is reintroduced into the lower part of the vessel is mounted within the vessel. The vessel shown in FIGS. 4 and 5 is of the same construction as the vessel according to FIGS. 2 and 3 as far as the cells are concerned, and the same reference numerals as used in FIGS. 2 and 3 have been used to designate identical parts.

The vessel illustrated in FIGS. 4 and 5 comprises a core member 40 provided above the transfer zone 32, said core member having such dimensions that the periphery thereof is located close to the wall of the vessel 1. A ring 41 of blades, which extends over the full periphery of the core member, is mounted on the external surface of the core member.

An annular groove 42 having a lock 43 provided in a zone located above the discharge cell is provided between the ring 41 and the wall of the vessel. The groove 42 comprises rotatable scrapers 44 which may be rotated by means of driving means (not shown). An elongated heat exchanger 45 with means (not shown) for supplying steam thereto and means (not shown) for discharging condensate is mounted within the central part of the vessel 1. The upper end 46 of the centrally mounted heat exchanger is connected with the zone above the core member 40 and at the lower end 47 it is connected with the zone below the bottom walls 25 of the compartments through a centrifugal blower 48 having a rotor shaft mounted in bearings provided externally of the vessel 1. The vessel shown also comprises a pipe 50 provided at the top of the vessel and serving to discharge excessive steam.

The apparatus illustrated in FIGS. 4 and 5 is operated in the same manner as the apparatus illustrated in FIGS. 2 and 3 as far as the drying of the solid particulate material is concerned.

Steam leaving the transfer zone 32 passes through the narrow gap between the periphery of the core member 40 and the groove 42 through the ring 41 of blades. These blades create a strong cyclone field which causes essentially all solid particles to be thrown out towards the wall of the vessel and to be collected in the annular groove 24. The particles collected therein are conveyed into the lock 43 by the scrapers 44, and from the lock 43 they pass into the discharge cell. When excessive steam has been discharged through the pipe 50 at the top of the vessel 1, the blower wheel 48 will cause the remaining steam to pass through the heat exchanger 45 from the upper end 46 thereof and through the lower end 47 and further into the zone below the bottom walls 25 and into the compartments 23.

We claim:

1. A process for removing liquid from a solid particulate material whose particles have non-uniform sizes, without the need for effecting initial disintegration of the solid particulate material, said method comprising the steps of successively passing said solid particulate material into a plurality of elongated, vertically-extending zones which communicate at their upper ends with a common transfer zone, some of said plurality of zones being treatment zones and at least one of said plurality of zones being a discharge zone, supplying superheated steam to said treatment zones so as to cause liquid to be evaporated from the particles of solid particulate material therein; subjecting said solid particulate material to a whirling motion such that at least partially dried particles are caused to move out of said treatment zones at their upper ends and into a part of said transfer zone which is located above the upper end(s) of said discharge zone(s), at which time they fall downwardly into said discharge zone(s), which has no steam supplied thereto, under the influence of gravity; and removing the dried particles of said particulate material which have fallen into said discharge zone(s).

* * * * *

UNITED STATES PATENT AND TRADEMARK OFFICE
CERTIFICATE OF CORRECTION

PATENT NO. : 4,813,155

DATED : March 21, 1989

INVENTOR(S) : Arne S. JENSEN et al.

It is certified that error appears in the above-identified patent and that said Letters Patent is hereby corrected as shown below:

Title page, the following should be inserted:

[30] FOREIGN APPLICATION PRIORITY DATA

February 24, 1984 [DK] Denmark ....... 1013/84

Signed and Sealed this

Eighth Day of August, 1989

*Attest:*

DONALD J. QUIGG

*Attesting Officer* *Commissioner of Patents and Trademarks*